No. 706,863. Patented Aug. 12, 1902.
J. Q. SHAFFER.
METHOD OF MANUFACTURING GLASS TOMBSTONES, &c.
(Application filed Sept. 16, 1901.)
(No Model.)

WITNESSES
Harry Barton
George Kane

INVENTOR
John Q. Shaffer
by Connolly Bros. Attorneys

UNITED STATES PATENT OFFICE.

JOHN Q. SHAFFER, OF PITTSBURG, PENNSYLVANIA.

METHOD OF MANUFACTURING GLASS TOMBSTONES, &c.

SPECIFICATION forming part of Letters Patent No. 706,863, dated August 12, 1902.

Application filed September 16, 1901. Serial No. 75,584. (No model.)

*To all whom it may concern:*

Be it known that I, JOHN Q. SHAFFER, a citizen of the United States, residing at Pittsburg, in the county of Allegheny and State of Pennsylvania, have invented certain new and useful Improvements in Methods of Manufacturing Glass Tombstones and the Like; and I do hereby declare the following to be a full, clear, and exact description of the invention, such as will enable others skilled in the art to which it appertains to make and use the same.

My invention has relation to methods of manufacturing glass tombstones, cornerstones, memorial tablets, and the like, and has for its object the provision of the novel method of inclosing in large and heavy masses of glass plates or tablets of the same material bearing portraits, inscriptions, dates, names, or other wording or designs which it is desired to perpetuate.

My invention consists in the novel method of manufacture hereinafter described and claimed.

Figure 1:
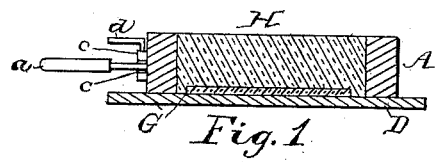
Figure 2:
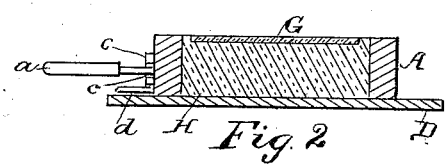
Figure 3:
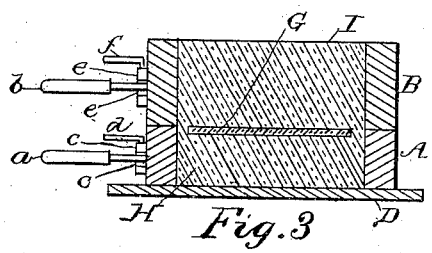
Figure 4:
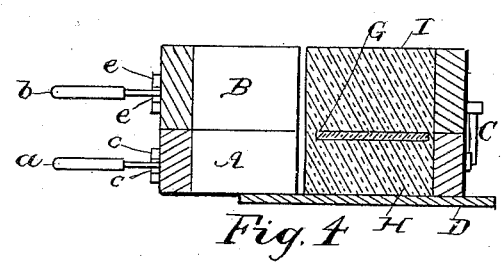
Figure 5:
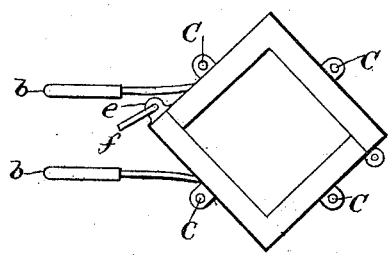
Figure 6:
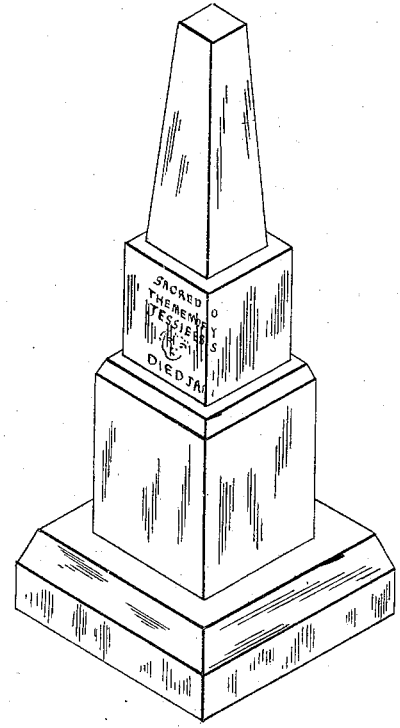

Referring to the accompanying drawings, wherein I have illustrated the apparatus for carrying my method of manufacture into effect and have also illustrated an article made according to such method, Figure 1 is a vertical sectional view taken diagonally of the lower part of a compound mold and the bottom plate on which said mold rests with an inscribed glass plate in position therein and a mass of glass which has been poured upon the top of such plate. Fig. 2 is a similar view with the mold turned over. Fig. 3 is a vertical sectional view of the same with the upper part of the compound mold in position upon the lower part and inclosing a mass of glass which has been poured upon the top of the mass of glass formed in the lower part and the inscribed glass plate after the lower mold and its contents have been reversed in position. Fig. 4 is a vertical sectional view of the upper and lower parts of the mold, showing the manner of opening the same to permit of the removal of the glass. Fig. 5 is a top view of the mold, and Fig. 6 is a perspective view of the completed article forming part of a tombstone.

In carrying my method into effect with the novel apparatus illustrated in the drawings I proceed as follows: I provide a compound mold composed of the lower part A and the upper part B, both of which are sectional molds, being each composed of sections hinged together and locked when closed by means of the interlocking lugs and pin commonly used on sectional molds of the ordinary kind. The upper and lower parts of my compound mold are of the same size interiorly, and the upper part B when in position for the casting operation rests upon the lower part, being maintained in its proper relation thereto by pins C C, which embrace the sides of the lower part A. The lower part A of the mold rests on a bottom plate D, and the upper and lower parts are provided with handles *a a* and *b b*, respectively, for convenience in handling. Interlocking lugs *c c* and a pin *d* serve to keep the lower part A closed, while similar lugs *e e* and a pin *f* serve a like purpose on the upper mold. The upper and lower parts A and B of the mold are formed each in two sections, being hinged at the corners diagonally opposite the interlocking lugs and pins.

My novel method of manufacture is effected in the following manner: A plate of glass G is prepared by having the inscription, portrait, design, or other matter which it is desired to preserve imprinted on its surface in any desired or known manner—such, for instance, as the well-known photoprinting process—and burned in, so as not to be affected by the heat to which it is subsequently subjected. The plate so prepared is laid in the lower part A of the mold, face up, and a mass of glass H is then poured upon the plate. The glass which is poured upon the plate being very soft will of course touch the plate at one point and then spread over its surface and in so spreading will displace the air in contact with the plate and come into perfect contact with every part of its surface, thus preventing the formation of bubbles between the surface of plate and the glass which has been poured upon it. After sufficient glass has been cast into the lower part A to quite fill the same and form the mass which is shown at H in the drawings the lower part A of the mold, with its contents, is turned over, the mass of glass H being now beneath the plate G and the back of the latter exposed at the top of the mold. The upper part B of the mold is now placed in position on the lower part A, and a second mass of glass is poured into the part B of the mold and upon the back of the plate G, which is now uppermost. The mass of glass which is formed in the mold part B is shown at I in the drawings and, being cast upon the plate G while in a molten condition, welds to said plate and to the portion of the mass H which extends outside the plate, and the two masses of glass and the plate become a solid integral body. After the casting operation has been performed as described the glass is allowed to harden sufficiently to stand without spreading, and the pins d and f being drawn out of the lugs c c and e e the two parts A B of the mold are opened and removed, leaving the completed block of glass standing on the bottom plate. The annealing of the glass is effected in the usual manner, and after it has been annealed it is cut and polished and may, if desired, be etched or otherwise ornamented. The side of the block next the inscription or design will, by preference, be highly polished, so as to leave inscription or whatever may have been imprinted on the plate exposed to view behind the layer of perfectly transparent glass.

By the casting method described I am enabled to form an absolutely solid mass of perfectly transparent glass absolutely devoid of air-bubbles, having a design or inscription fixed in the body of the glass and as permanent in character as the glass itself.

In preparing the plate of glass G, upon which the inscription, portrait, or other matter is imprinted, it will of course be understood that the plate of glass can be of any desired color, a suitable artistic effect being produced by means of black letters on a white ground.

The two molten masses of glass which are cast around and upon the plate may be either clear or colored glass of the same or different colors, or the glass at the back of the inscription or other matter may be opaque, while that in front is transparent, and other variations in the matter of coloring or ornamenting the glass may be practiced, according to the taste or fancy of the manufacturer.

In Fig. 6 of the drawings I have shown the block of glass, prepared in the manner hereinbefore described, in position as one of the sections of a tombstone; but there are many other uses to which blocks of glass with inclosed inscriptions or designs may be applied—for instance, as memorial tablets, corner-stones, bases for statuary, &c.

Having described my invention, I claim—

1. The method of manufacturing a block of glass, having an inclosed imprint or design, consisting in casting a mass of glass upon the face of a plate of glass, bearing the design or imprint, then casting a second mass of glass upon the back of the same.

2. The method of manufacturing solid sections of glass with an inclosed inscription or the like consisting in placing a plate of glass imprinted with the desired matter within and at the bottom of the mold, casting glass within the mold upon top of the plate, then reversing the position of the mass so cast, and then casting a second mass within another mold and upon the other side of the plate.

In testimony whereof I affix my signature in presence of two witnesses.

JOHN Q. SHAFFER.

Witnesses:
 A. A. CONNOLLY,
 MARY M. HEDDEN.